United States Patent [19]

Schulze

[11] Patent Number: 4,630,141
[45] Date of Patent: Dec. 16, 1986

[54] TAPE CASSETTE NON-ERASE MECHANISM

[75] Inventor: Jürgen Schulze, Nuremberg, Fed. Rep. of Germany

[73] Assignee: Grundig E.M.V. Elektro-Mechanische Versuchsanstalt Max Grundig holland. Stiftung & Co. KG, Fed. Rep. of Germany

[21] Appl. No.: 781,099

[22] Filed: Sep. 27, 1985

[30] Foreign Application Priority Data

Sep. 28, 1984 [DE] Fed. Rep. of Germany ....... 3435683

[51] Int. Cl.$^4$ .................. G11B 15/04; G11B 19/04
[52] U.S. Cl. .................................. 360/60; 360/132
[58] Field of Search ................. 360/60, 132, 135, 137

[56] References Cited

U.S. PATENT DOCUMENTS

| 3,848,265 | 11/1974 | Biery et al. | 360/60 |
| 3,950,786 | 4/1976 | Shapley | 360/60 |
| 3,997,916 | 12/1976 | Staar | 360/60 |
| 4,000,515 | 12/1976 | Fukawa | 360/60 |
| 4,012,011 | 3/1977 | Saito | 360/60 X |
| 4,041,537 | 8/1977 | Kishi | 360/60 |
| 4,107,743 | 8/1978 | Mestdagh | 360/60 |
| 4,521,820 | 6/1985 | Fann | 360/60 X |

Primary Examiner—Vincent P. Canney
Assistant Examiner—Alyssa H. Bowler
Attorney, Agent, or Firm—Kane, Dalsimer, Kane, Sullivan & Kurucz

[57] ABSTRACT

A device for use in a tape cassette recorder preventing the accidental erasing of a magnetic tape contained in a tape cassette which includes a toggle lever for scanning the recess of the cassette which is engageable with a slide of a push button activator in such a manner that the toggle lever can arrest the movement of the slide depending on whether the recess is accessible or not.

6 Claims, 3 Drawing Figures

TAPE CASSETTE NON-ERASE MECHANISM

BACKGROUND OF THE INVENTION

1. Field of the Invention

The invention relates to a device for preventing the accidental erasing of a magnetic tape in a cassette when operating a cassette device.

2. Description of the Invention

It is well known that cassette, audio and video recorders are provided with devices which prevent an accidental erasing of the magnetic tape in a cassette when operating the cassette device. For example, in blank cassette tapes there is provided a recess in the back corners of the cassette having a fracturable member thereover. Pre-recorded tapes already have this member fractured. Once a desired recording has been made on the tape, fracturing the member covering the recesses will prevent re-recording or erasing the tape since the recorder will sense whether the recess is intact.

In this regard, for example, in German Pat. No. DE-PS 13 735 issued Mar. 21, 1974, provides for a cassette tape recorder which includes a device for preventing the accidental erasing of a magnetic tape contained in a cassette. For this purpose, two scanning levers scan the recesses provided in the cassette to determine if the recesses are open or still closed. A tension spring is provided and acts on the scanning lever and a plurality of rocker arms which are successively switched, so as to couple with an actuating lever which controls the operation of the device and thereby allows or prevents recording on the magnetic tape. Such a device, while desirable in many respects, is relatively expensive and not suitable for low cost devices.

Other arrangements utilize scanning levers fabricated out of plastic and include a spring which acts on the scanning lever and is formed as a single piece with the plastic scanning lever. While such a design provides for improved cost savings, unfortunately, it suffers the disadvantage in that the spring may become weak due to temperature influences, thereby hindering the scanning lever in performing its operation.

SUMMARY OF THE INVENTION

It is therefore an object of the invention to provide for a device which prevents the accidental erasing of a magnetic tape which is contained in a cassette which is relatively simple yet effective in operation. The present device is preferably made of plastic and does not require a spring to provide effective operation.

In this regard, the device provides for a pivoted toggle lever having two arms, one of which is engageable with the recess, the other of which is engageable with a slide member of the tape cassette recorder. Depending upon whether the recess is opened or blocked, the toggle lever will allow or prevent the movement of the guide member, of the cassette recorder for recording or preventing recording on the tape in the tape cassette.

BRIEF DESCRIPTION OF THE DRAWINGS

Thus, by the present invention, its objects and advantages will be realized, the description of which should be taken in conjunction with the drawings, wherein.

DETAILED DESCRIPTION OF THE PREFERRED EMBODIMENT

Figure 1:
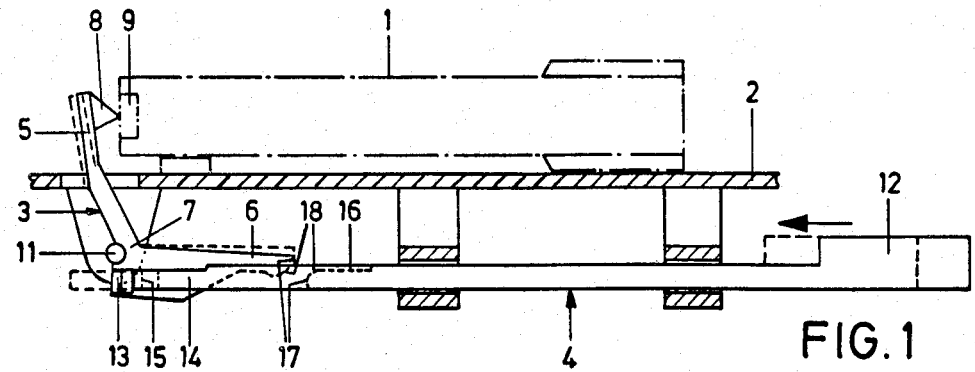
FIG. 1 is a side elevation partially sectional view of a portion of a tape cassette recorder incorporating the teachings of the present invention, along with a tape cassette therein having an obstructed recess.
Figure 2:
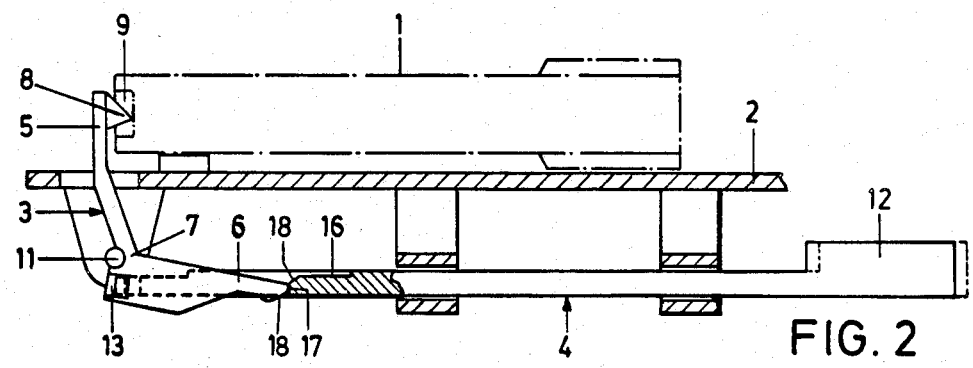
FIG. 2 is similar to FIG. 1 except the recess of the tape cassette is not obstructed.

Turning now more particularly to the drawings in FIGS. 1 and 2, there is shown a typical tape cassette 1 which is shown positioned in or on a tape cassette recording device 2 in which only the illustrative elements of the recording device 2 are shown. In this regard, a toggle lever 3 is provided and positioned such that it abuts the rear portion of the tape cassette upon its insertion. A slide member 4 is provided and adapted to engage toggle lever 3. In this regard, toggle lever 3 comprises two uniformly long shank parts 5,6 and is pivotably mounted in the center at toggle lever portion 7, which is pivotably maintained by the housing 2. The upper shank part 5 of the toggle lever is provided with a boss 8 on its end. This boss 8 serves to scan or probe a recess 9 which are common on tape cassettes. As aforenoted (shown in phantom), in typical cassettes, if the frangible portion in front of the recess is broken, the intent is that the tape not be erased and recorded over.

As shown in FIG. 1, the frangible portion over recess 9 is intact and therefor the magnetic tape can be erased in the cassette during the operation of the device and a re-recording of the magnetic tape is possible. As soon as the recess 9 is accessible to the boss 8 of toggle lever 3, the cassette cannot be accidentally erased.

In this regard, lower shank 6 of the toggle lever 3 is intended to extend into a slot-like opening 10 (see FIG. 3) of the slide 4. The toggle lever 3 is provided on both sides with a bearing or support pin 11 which serve to pivotably support the toggle lever 3 in the device housing 2. Coupled to the slide 4 also shows an actuating button 12, for example, a record button on a tape cassette. When the slide 4 is actuated in the direction of the arrow in FIG. 1 and is brought into the position of the dotted line, the toggle lever 3 cannot be pivoted because it cannot access recess 9 in the cassette. This allows the slide 4 to slide beneath the lower shank 6 of the toggle lever 3, thereby allowing the actuating button 12 to effect the desired operation, i.e., recording. However, when the recess 9 of cassette 1 is opened and accessible, torque is exerted on the toggle lever 3 by the movement of the actuating the slide 4 by way of friction between the toggle lever 3 and the slide 4 causing the toggle lever pivot clockwise with its boss 8 going into the recess 9 of the cassette 1.

This pivoting of the toggle lever 3 when the recess 9 in the cassette 1 is opened is shown in FIG. 2, and results in the positioning the slide 4 of the respective faces 17 on the toggle lever 3 and slide 4 to abut preventing further movement of the slide 4 in the direction of the arrow. This prevents the activation of the function, i.e., recording, by activating button 12 so that undesired erasure and re-recording is avoided.

Figure 3:
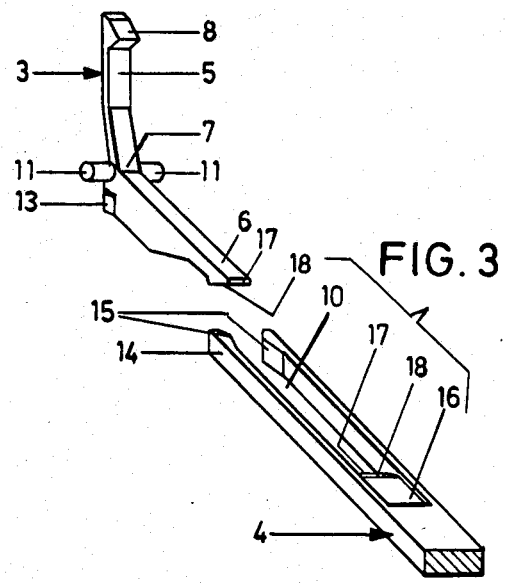
FIG. 3 is an exploded view of the toggle and a portion of the guide member incorporating the teachings of the present invention.

The toggle lever 3 and the partially illustrated slide 4 are shown as individual parts in FIG. 3. The toggle lever 3 is provided with cam shaped bosses 13 on both side beneath its support location (support pin 11) for insuring adequate torque is provided to the toggle lever 3 upon movement of slide 4 which in turn is provided with a bevels 15 on both sides at the inner surfaces of the fork-like end 14. To provide for complete arresting of the slide 4, the end of lower shank 6 of the toggle lever 3 and the end of connecting rib 16 on slide 4 are provided with respective flat abutment faces 17 which, as aforenoted, engage when recording or erasing of the tape is to be prevented.

In the situation where recording or erasing is desired as in FIG. 1, the bevels 15 in the fork-like end 14 of the slide 4 move over the cam shaped bosses 13 on the toggle lever 3 into a locking position. This will prevent any permanent change, stretching or widening of the fork-like part 14 of the slide 4. In addition, sloped portions 18 are provided adjacent surfaces 17 so as to allow ease in passing slide 4 under shank 6 in the situation shown in FIG. 1.

Thus, it is apparent that the present invention provides for a simple yet effective manner of preventing undesired erasing of a magnetic tape and although a preferred embodiment is disclosed and described in detail hereby, its scope should not be limited thereby, rather its scope should be determined by that of the appended claims.

What is claimed is:

1. A device for use in a tape recording device to prevent the undesired erasing of magnetic tape contained in a cassette having a recess portion for indicating erasing or non-erasing of the tape, said device comprising:

toggle means pivotal about an axis comprising first shank means for scanning a recess in a tape cassette and second shank means for transmitting the position of the first shank means;

a slide member coupled to a desired activator with said slide member engageable with the second shank; and said toggle means being in an unbiased state and engageable with the slide member and pivotal in such a manner that when the recess is open and accessed by the first shank means said toggle means is pivoted thereby positioning said second shank means to engage and stop the movement of said slide member towards said toggle means and thereby preventing undesired erasing of the magnetic tape, and alternatively when the recess is closed said toggle means is positioned such that said second shank means allows the movement of said side member toward said toggle means.

2. The invention in accordance with claim 1 wherein said first shank means includes a boss for scanning the recess, said second shank means includes stop means for engaging a stop means on the slide member, and whereby the movement of the slide member causes the toggle means to pivot such that when the boss enters the recess the respective stop means are aligned to prevent further movement of the slide member.

3. The invention in accordance with claim 2 wherein said toggle means includes camming means engageable with the slide means which results in the pivoting of the toggle means.

4. The invention in accordance with claim 3 wherein said slide member includes a fork-like end having opposite legs between which the second shank means is adapted to slide, said ends of the legs including inwardly projecting portions engageable with the camming means.

5. The invention in accordance with claim 4 wherein said toggle means and said slide member are made of plastic with the slide member being made of a yieldable plastic.

6. The invention in accordance with claim 5 wherein adjacent said respective stop means are respective sloping surfaces which facilitate the movement of the second shank means over the slide means when the recess is not accessible to the boss on the first shank means.

* * * * *